UNITED STATES PATENT OFFICE.

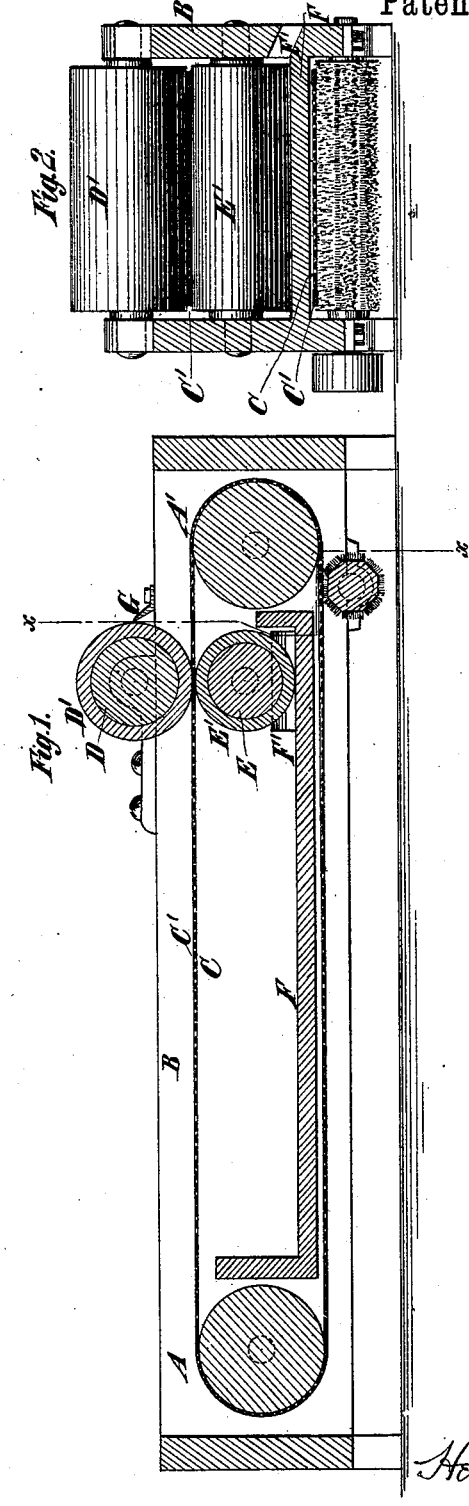

HENRY R. RANDALL, OF BROOKLYN, NEW YORK, ASSIGNOR OF ONE-HALF TO CHARLES G. TILL, OF SAME PLACE.

APPARATUS FOR EXPRESSING MALT EXTRACTS FROM THE REFUSE OF BREWERS' MASH.

SPECIFICATION forming part of Letters Patent No. 253,425, dated February 7, 1882.

Application filed July 22, 1881. (No model.)

*To all whom it may concern:*

Be it known that I, HENRY R. RANDALL, of Brooklyn, in Kings county, and State of New York, have invented certain new and useful Improvements in Apparatus for Expressing Malt Extract from the Husks or Refuse of Brewers' Mash, of which the following is a specification.

These improvements relate to the apparatus which is employed for expressing malt extract or liquid from the husks or refuse of what is known as "brewers' mash."

The improvements consist in the combination of a reticulated or foraminous apron, rollers arranged one above another and having faces of india-rubber or other elastic material, between which said apron passes and to which material is carried by said apron, and a receptacle for liquid under the lower roller and that portion of the apron which is between and adjacent to said rollers.

The improvements further consist in the combination, with the aforesaid parts, of a binding of india-rubber or other suitable but preferably elastic material applied to the longitudinal edges of the apron for the purpose of protecting the same from injury and preventing them from doing damage to the rollers.

In the accompanying drawings, Figure 1 is a central longitudinal section of an apparatus embodying my improvements; and Fig. 2 is a transverse section of the same, taken at the dotted line $x\ x$, Fig. 1.

Similar letters of reference designate corresponding parts in both figures.

A A' designate two rollers supported in a frame, B, near the ends of the latter. C designates a reticulated endless apron which travels around the said rollers and preferably is made of wire-cloth, although it may be of any other suitable reticulated material or of foraminous material. The roller A' is provided with a pulley, whereby it may be driven through a belt applied to the pulley.

D E designate pairs of rollers arranged one above another, between which passes the upper portion of the apron C, or, in other words, the portion which is above the rollers A A'. Any desirable number of pairs of these rollers may be employed.

F designates a trough arranged below the upper portion of the apron C and made slightly wider inside than the apron, so as to collect all malt extract or other liquid which passes through that portion of the apron. Near one end this trough is provided with a side outlet, F', from which the liquid collected in it may be discharged. The whole apparatus may be arranged on an incline, or the trough alone may be inclined, and in either case the liquid will run to that end of the trough which is provided with a side outlet and be discharged. This trough with the side outlet is of material importance; but I have yet to describe the most important features of my invention.

One very important feature consists in providing the pairs of rollers D E with faces of india-rubber or other elastic material, D' and E'. These elastic faces enable the rollers to operate with a yielding pressure, and also to accommodate themselves to different thicknesses of material passing between them on the apron C. Moreover, as the elastic faces press more perfectly into the interstices of the apron C, they are more effectual in expressing all liquid from any substance which is subjected to them. The faces of the rollers, when elastic, do not crush, bend, and ultimately break the wires of the apron C, as they would otherwise. Hence when they are made elastic the durability of the apron is increased.

To prevent the apron C from being injured or torn at the edges, I apply to the edges bindings C', of india-rubber or other suitable material. These bindings also prevent the apron from doing damage to the rollers or other parts with which it may come in contact.

I may employ, in connection with the rollers D, scrapers G for ridding them of any solid matter which may adhere to them, and I may combine a rotary brush, H, with the apron C for clearing its meshes. The brewers' mash or other substance from which it is desired to express liquid is placed on the apron C, and by it carried between the pairs of rollers D E, where the liquid is expressed from it. The liquid thus expressed is collected by and discharged from the trough F into any suitable receptacle.

What I claim as my invention, and desire to secure by Letters Patent, is—

1. The combination, with a reticulated or foraminous apron, of rollers arranged one above the other and both having faces of india-rubber or other elastic material, between which said apron passes and to which material is carried by said apron, and a receptacle for liquid under the lower roller and that portion of the apron which is between and adjacent to the rollers, substantially as and for the purpose specified.

2. The combination of a reticulated or foraminous apron having its edges bound with india-rubber or other suitable material with rollers arranged one above another and having faces of india-rubber or other elastic material, between which the apron passes and to which material is carried by said apron, and a receptacle for liquid under the lower roller and that portion of the apron which is between and adjacent to said rollers, substantially as and for the purpose specified.

HENRY R. RANDALL.

Witnesses:
CHAS. G. TILL,
EDWIN H. BROWN.